Oct. 7, 1969 A. KORSCH 3,470,948
BEND-FREE ROLLER FOR CALENDERS, ROLLING MILLS, AND THE LIKE
Filed May 8, 1967 3 Sheets-Sheet 1

INVENTOR
Alfred Korsch

Oct. 7, 1969         A. KORSCH         3,470,948
BEND-FREE ROLLER FOR CALENDERS, ROLLING MILLS, AND THE LIKE
Filed May 8, 1967                        3 Sheets-Sheet 2
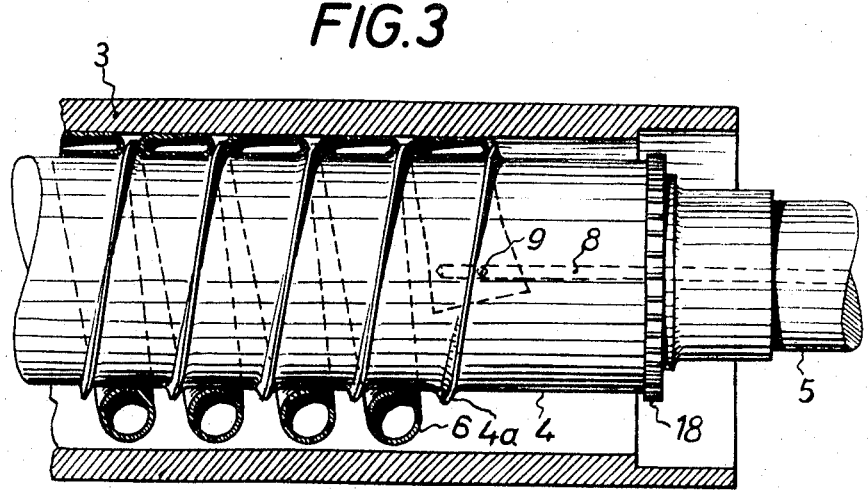
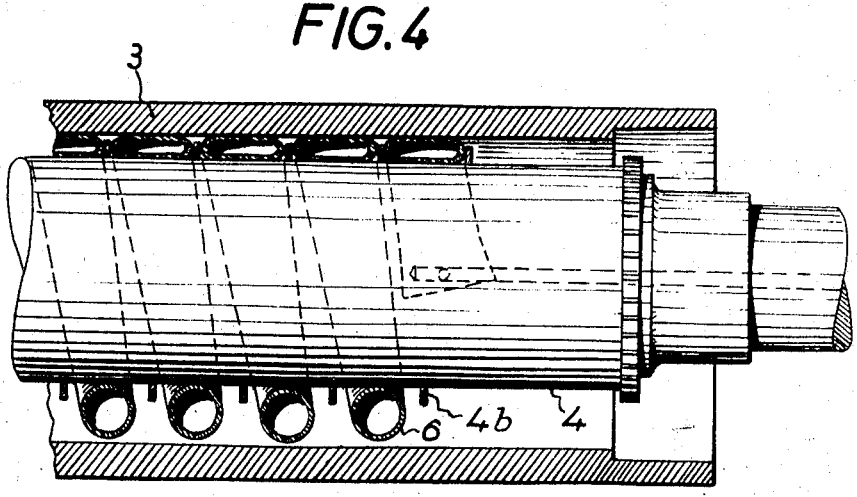
INVENTOR
Alfred Korsch Oct. 7, 1969   A. KORSCH   3,470,948
BEND-FREE ROLLER FOR CALENDERS, ROLLING MILLS, AND THE LIKE
Filed May 8, 1967   3 Sheets-Sheet 3

INVENTOR
Alfred Korsch
By

United States Patent Office 3,470,948
Patented Oct. 7, 1969

3,470,948
BEND-FREE ROLLER FOR CALENDERS, ROLLING MILLS, AND THE LIKE
Alfred Korsch, Krefeld, Germany, assignor to Kleinewefers Joh. Sohne Maschinenfabrik, Krefeld, Germany
Filed May 8, 1967, Ser. No. 636,793
Claims priority, application Germany, May 18, 1966, K 59,299
Int. Cl. F28f *5/02;* F28d *11/02;* F04b *43/08*
U.S. Cl. 165—86                                10 Claims

ABSTRACT OF THE DISCLOSURE

The present concerns a roller structure comprising a roller body and a roller shaft eccentrically located within said roller body in spaced relationship thereto while inflatable means are located between said roller body and said roller shaft so that in inflated condition said inflatable means is strongly compressed in the narrow gap between said roller and said roller shaft but is free to expand completely in the wider gap between said roller and said roller shaft. The roller body and roller shaft are coupled to each other so as to rotate at the same speed whereby different portions of said inflatable means are, per each revolution of said roller and roller shaft, compressed and expanded in the manner of a rolling automobile tire.

---

The present invention relates to bent-free rollers for calenders, rolling mills, or the like, and is, in particular, directed to such rollers with which the bend is remedied or nullified by a pneumatic or hydraulic inflatable body arranged on a stationary or rotatable roller shaft in the interior of the roller designed as a tubular body. For this purpose, numerous suggestions have been made.

With designs employing a stationary shaft, the friction occurring between the shaft and the rotating tubular roller has to be reduced by special and frequently expensive provisions. Some of the heretofore known designs additionally suffer from leakage losses. Therefore, attempts have been made to avoid the relative movement between roller body and shaft by so designing the roller shaft that it likewise rotates while only those chambers which are respectively located opposite the working gap are provided with a pressure medium by means of a coaxial pressure distributing device. Also, these designs are expensive and fail to eliminate the leakage losses. Other suggestions in the above mentioned direction are still more expensive, and therefore have not been practically adopted.

It is, therefore, an object of the present invention to provide a design of the above mentioned general character, which will considerably reduce the cost for preventing the bending of free rollers of the type involved with rotating shaft.

It is another object of this invention to provide an arrangement as set forth in the preceding paragraph, which will avoid sliding seals of any type and thereby will also completely eliminate leakage losses.

These and other objects and advantages of the invention will appear more clearly from the following specification, in connection with the accompanying drawings, in which:

FIGURE 3 illustrates a section through a roller of the general type shown in FIGS. 1 and 2, but provided with a spiral groove in the roller shaft.

FIGURE 4 is a section through a roller of the general type of FIGS. 1 and 2, but with a spiral band welded onto the roller shaft.

The roller according to the present invention, which comprises a tubular roller body with an inner rotating roller shaft, and a pneumatic or hydraulic inflatable body on the roller shaft, is characterized primarily in that the gap pressure absorbing roller shaft is eccentrically journalled in the roller body and by means of coupling jaws, followers, gears, or the like, the roller shaft and the roller are moved at the same speed while the roller shaft is surrounded by an inflatable body distributed over the circumference of the roller shaft, said inflatable body so dimensioned that in the narrow portion of the gap between the tubular roller and the roller shaft, it will, under pressure, engage the tubular roller whereas in the wider portion of the gap it can fully expand without exerting pressure on the roller. The pressure of the inflatable body may be variable in conformity with the load acting on the roller, and the pressure medium for said inflatable body may be introduced into the latter through a central bore and a rotatable body.

Figure 1:
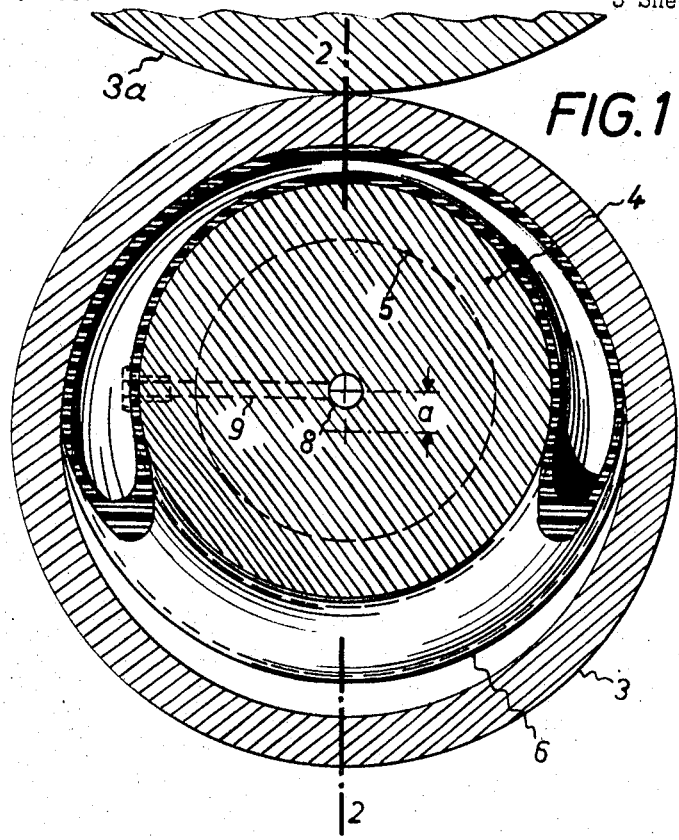
FIGURE 1 is a cross section of a roller according to the present invention, with an inflating body in the form of a pressure hose spirally wound around the shaft, said section being taken along the line I—I of FIG. 2.
Figure 2:
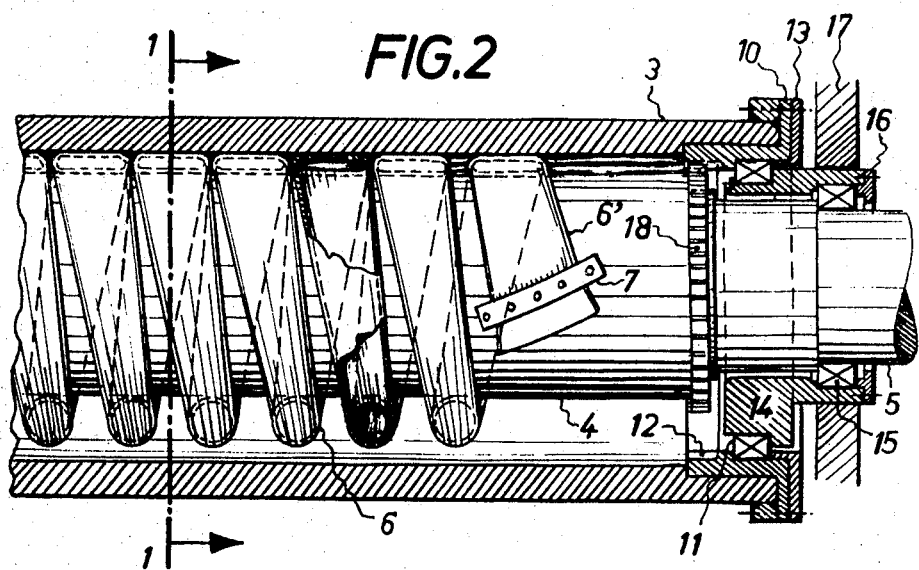
FIGURE 2 is a longitudinal section through a roller according to the invention, said section being taken along the line II—II of FIG. 1.

As will be evident from FIGS. 1 and 2, the roller consists of a tubular body 3 of the necessary wall thickness which is supported by a rotatable roller shaft 4 which is eccentrically journalled with regard to the tubular roller body 3. The arrangement shown in the drawing furthermore includes an inflatable body which comprises a long hose 6 of a smaller cross section which is spirally wound about the roller shaft 4 and has its sealed ends 6' connected to the roller shaft 4 by means of clamps 7 or the like. The pressure medium for inflating said hose 6 is introduced through a central bore 8 and a radial branch bore 9. The pressure medium may be introduced into the hose at any desired point.

The eccentricity *a* between the roller shaft 4 and the roller or tubular body 3 depends on the wall thickness of the roller 3 and the required cross section of the roller shaft 4. On the other hand, the cross section and the maximum expandibility of the pressure hose 6 are so dimensioned that the hose will be able within the wider portion of the gap between roller shaft 4 and roller 3 to expand fully without contacting the roller body 3 whereas in the narrowest portion of the gap between the roller shaft 4 and the roller 3, the hose 6 will be considerably compressed. The roller 3 is so installed in the machine that the narrowest portion of the gap with maximum compression of the hose is adjacent the working gap.

In order to prevent the pressure hose 6 from accidentally moving in axial direction, according to the embodiment of FIG. 3, the roller shaft 4 has milled therein a groove 4a, the depth of which is relatively small with regard to the width of the groove. The groove 4a has to be so dimensioned that in the narrow gap it is completely filled by the flat compressed pressure hose.

The same effect can also be realized with the embodiment of FIG. 4 according to which a flat metal strip 4b is on edge in the form of a spiral wound around the roller shaft and is connected thereto in any convenient manner as, for instance, by welding. The pitch of said flat metal strip spiral and the height thereof are dimensioned according to the same considerations as discussed above in connection with the groove 4a of FIG. 3.

The bend-free roller 3 is driven similar to a normal roller through the intervention of the trunnions 5 of the roller shaft 4. In order to prevent slippage between the pressure hose 6 and the roller body 3 and in order to assure a slip-free drive of the roller 3, a power connection between the roller 3 and the roller shaft 4 is necessary. To this end and in conformity with the present invention, a gear 18 arranged on the roller shaft 4 meshes with inner gear-ring teeth 12 on the roller 3. In the particular embodiment shown in the drawing for manufacturing reasons, the inner teeth are provided on a bushing 10 inserted into the end portion of the roller 3. The said bushing 10 also has a race surface for an inner bearing 11 for receiving the roller 3. The eccentric journalling of the roller shaft 4 within the roller 3 is effected by outer bearings 15 which are arranged on the roller shaft trunnions 5. The said bearings 5 are inserted into bearing seats which are eccentrically located on the roller ends. While these bearing means are shown in the drawing at one end only, it is, of course, to be understood that a corresponding construction is also provided at the other end of the roller.

According to a further development of the present invention, a simple connection between the roller 3 and the roller shaft 4 is realized by the fact that bearing brackets 14 are inserted into the roller ends, which bearing brackets on one side carry the bearings 11 for the roller 3, and on the other side on an eccentric stud carry the bearings 15 for the shaft trunnions 5. The eccentric studs may themselves be directly clamped into the machine stand or frame means 17 or may be journalled in displaceable outer bearings or the like. Spacer discs 13 and 16 properly locate the bearings 11 and 15 and close the interior of the roller so as to exclude dust.

Figure 5:
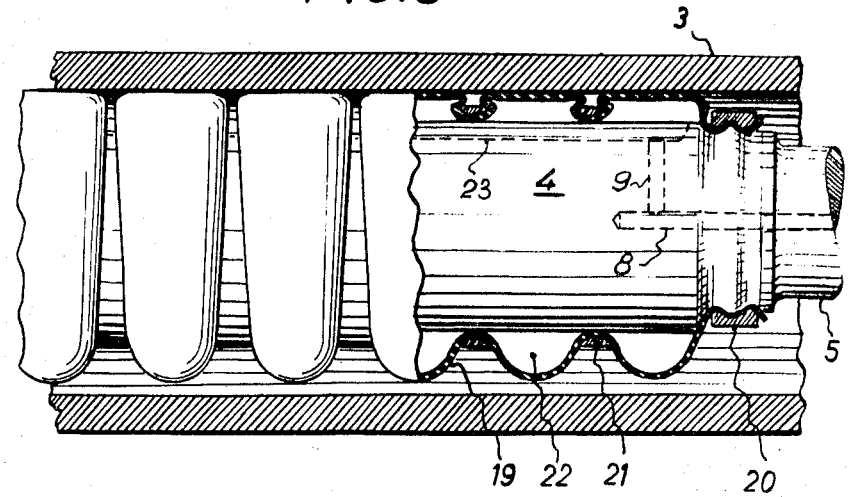
FIGURE 5 shows a longitudinal section through a roller according to the invention, in which the inflatable body consists of a hose pulled over the roller shaft.

FIGURE 5 shows a further embodiment of the inflating body according to the invention. In this instance, the inflatable body comprises a hose 19 of such a diameter that it can be pulled over the roller shaft 4 with a slight play. The two hose ends are, by means of bandages 20 connected so tightly to the roller shaft 4 that the space between said roller shaft 4 and the hose remains pressure tight. Inasmuch as the long hose would expand too much when it is subjected to pressure, it is subdivided into a plurality of annular chambers 22, by means of bandages 21 which are uniformly distributed over the entire length. In this way the same effect is obtained as with the spirally wound hose according to FIGS. 1 to 4. The supply of a pressure medium to all annular chambers is effected by a longitudinal groove 23 of a smaller cross section into which leads the central bore 8 with the transverse bore 9.

Figure 6:
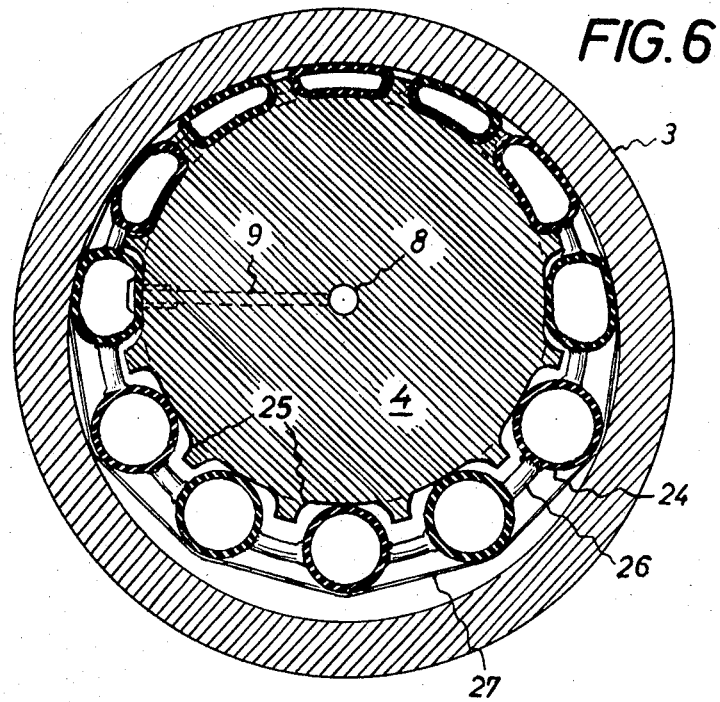
FIGURE 6 is a cross section through a still further modified roller according to the invention, in which the inflatable body comprises individual hoses distributed over the circumference of the roller shaft and extending in the longitudinal direction of the latter.

FIGURE 6 shows that the principle according to the present invention can also be realized by means of axis parallel hoses of small cross section. According to this embodiment, the hoses 24 are advantageously located in grooves 26 of the roller shaft 4. At one roller end, the hoses are sealed, whereas at the other roller end the hoses are connected to an annular conduit 26 so as to be able to receive a pressure medium. In order to prevent the hoses from bending in the wider portion of the gap between the roller shaft and the roller, the hose packet may at a plurality of areas be held together by means of light bandages 27 which may be of metal.

The pressure hoses are preferably made of a high temperature-resistant synthetic material, as for instance, of fluorized polyethylene.

It is, of course, to be understood that, if desired, the pressure hoses may also be armed or reinforced by inserts of textile material, metallic threads, or glass fiber threads. Inasmuch as the inflatable bodies are subjected to a continuous change in shape, similar to automobile tires, and since said inflatable bodies must not expand beyond a maximum value, it is advantageous to design said pressure hoses and, in particular, the arming or reinforcement thereof according to the principles governing the building up of automobile tires. Furthermore, it will be advantageous to cover those sides of the hoses which engage the inner surface of the roller 3 with a tread surface, for instance, a strip of synthetic material such as fluorized polyethylene armoured with metallic rivets.

According to a further development of the present invention, it is also possible to introduce a heating or cooling medium into the space between the inflatable bodies and the roller 3 while at both roller ends correspondingly shaped lip seals must be provided.

In view of the shape changing work of the hoses or inflatable bodies, a slight heating up will occur. If this developed heat is not conveyed away by the convection of the roller, and if for the respective working operation, a cold roller is a requirement, it is possible through a second bore to blow cooling air into the roller shaft between the inflatable body and the roller 3. A further cooling possibility consists in the inflatable body being acted upon hydraulically while the pressure medium circulates. An air buffer in the hydraulic system will then take care of the resilient pressure.

It is, of course, to be understood that the present invention is, by no means, limited to the particular constructions shown in the drawings, but also comprises any modifications within the scope of the appended claims.

What I claim is:

1. A roller structure, especially for calenders and rolling mills, which comprises: a rotatable roller body, frame means, a rotatable roller shaft eccentrically located in said rotatable roller body in spaced relationship thereto and rotatably journalled in said frame means, means drivingly connecting said roller shaft to said roller body so as to assure simultaneous rotation of said roller body and said roller shaft at substantially the same speed, and inflatable means interposed between said roller body and said roller shaft and substantially uniformly distributed over the outer periphery of said roller shaft in the whole length of the roller body, said inflatable means being adapted to be connected to means for conveying a fluid medium to and from said inflatable means being so dimensioned that in its inflated condition it is variably strongly compressed compressed in the narrow gap area eccentrically between said roller body and said roller shaft and can fully expand in the wide gap area eccentrically between said roller body and said roller shaft both rotatable during relative movement with respect to each other.

2. A roller structure according to claim 1, in which said inflatable means comprises a hose spirally wound around the outer peripheral surface of said roller shaft and having its ends sealed and firmly connected to the outer peripheral surface of said roller shaft.

3. A roller structure according to claim 2, in which the outer peripheral surface of said roller shaft is provided with a flat spiral groove having said hose partially located therein.

4. A roller structure according to claim 2, in which a relatively thin metal strip is wound on edge around the outer peripheral surface of said roller shaft so as to form therewith a spiral groove having said hose partially located therein, said strip being firmly connected to said roller shaft.

5. A roller structure according to claim 1, in which said inflatable means comprises a hose, said roller structure also comprising a plurality of bandages placed firmly around said hose in a direction transverse to the longitudinal direction of said hose while being spaced from each other in the axial direction of said hose so as to form a plurality of annular chambers around said roller shaft, and conduit means leading to said chambers for inflating the same.

6. A roller structure according to claim 1, in which said inflatable means comprises a plurality of individual hoses, said hoses having one end thereof tightly closed while at the other end of said hoses there is provided an annular conduit interconnecting said hoses, said roller shaft being provided with conduit means adapted to be connected with a source of fluid pressure and communicating with said hoses.

7. A roller structure according to claim 6, in which the outer periphery of said roller shaft is provided with longitudinally extending grooves respectively having said hoses partially located therein.

8. A roller structure according to claim 1, in which the means drivingly connecting said roller shaft to said roller body comprise a gear connected to said roller shaft and an inner gear ring connected to said roller body and meshing with said gear.

9. A roller structure according to claim 1, which includes means leading into the space between the inflatable means and the tubular body for conveying thereto a fluid for selectively heating and cooling said space.

10. A roller structure according to claim 1, which includes two bearing supports respectively arranged at the opposite ends of said roller shaft, each of said bearing supports comprising an inner section having its outer periphery eccentrically located with regard to said roller shaft and also comprising a second section coaxially arranged with said roller shaft, first anti-friction bearing means located between said first section and said roller body, and second antifriction bearing means located between said roller shaft and said second section, said second section being located in said frame means.

References Cited

UNITED STATES PATENTS

| | | | |
|---|---|---|---|
| 2,617,362 | 11/1952 | Parsons | 103—149 |
| 2,882,830 | 4/1959 | McDuffie | 103—149 X |
| 2,898,864 | 8/1959 | Japolsky | 103—149 |
| 2,915,292 | 12/1959 | Cross | 165—89 |
| 3,358,609 | 12/1967 | Worth et al. | 103—149 |
| 2,197,575 | 4/1940 | Wert | 74—332 |
| 2,414,355 | 1/1947 | Bogoslowsky | 103—149 |
| 3,397,739 | 8/1968 | Miller | 165—86 |

ROBERT A. O'LEARY, Primary Examiner

T. W. STREULE, Assistant Examiner

U.S. Cl. X.R.

29—113; 103—149